United States Patent [19]
Levy

[11] 3,971,333
[45] July 27, 1976

[54] ACTIVATION INDICATOR FOR A FIRE DETECTOR

[76] Inventor: Albert Levy, 1605 Pennington Road, Philadelphia, Pa. 19151

[22] Filed: Mar. 28, 1975

[21] Appl. No.: 563,148

[52] U.S. Cl. ............................. 116/114.5; 73/358
[51] Int. Cl.² ..................... G01K 1/14; G01K 11/06
[58] Field of Search ............ 116/114.5, 106, 114 Y; 73/358

[56] References Cited
UNITED STATES PATENTS

| | | | |
|---|---|---|---|
| 1,496,194 | 3/1924 | Ziegler | 116/114.5 |
| 1,509,110 | 9/1924 | Potter | 116/106 |
| 1,577,892 | 3/1926 | Buchanan | 116/106 |
| 2,013,466 | 9/1935 | Jones | 116/106 |
| 2,058,288 | 10/1936 | Bamonte | 116/114.5 X |
| 2,431,239 | 11/1947 | Gallagher | 116/114.5 |
| 2,896,568 | 7/1959 | Pryor et al. | 116/114.5 |
| 3,192,890 | 7/1965 | Smith | 116/106 X |
| 3,244,137 | 4/1966 | Garvey | 116/114.5 X |

Primary Examiner—Richard C. Queisser
Assistant Examiner—Daniel M. Yasich
Attorney, Agent, or Firm—Robert K. Youtie

[57] ABSTRACT

An activation indicator for a fire detector wherein fusible securing means, such as solder, or the like, is fixed to and positions an attachment member in proximate heat exchange relation with a fire detector, and resilient means is connected to the attachment member urging the latter out of its heat exchange position, elevated temperature serving to melt the securing means and free the attachment member for movement by the resilient means out of its original position, to thereby indicate activation of the fire detector by the elevated temperature.

7 Claims, 13 Drawing Figures

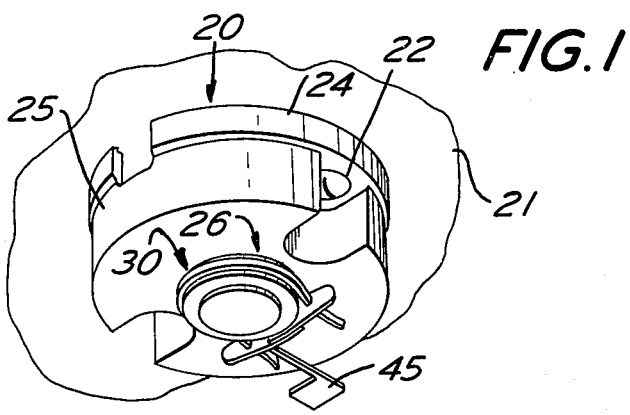
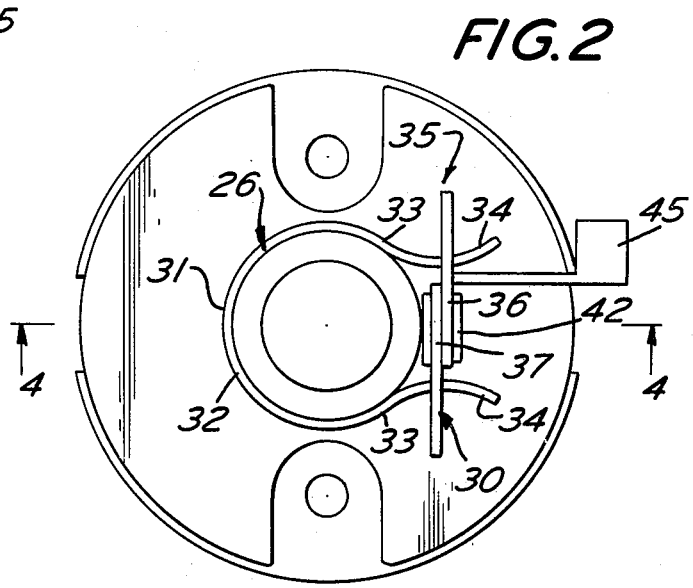
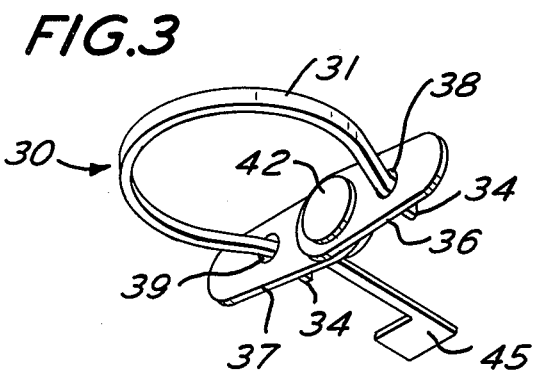
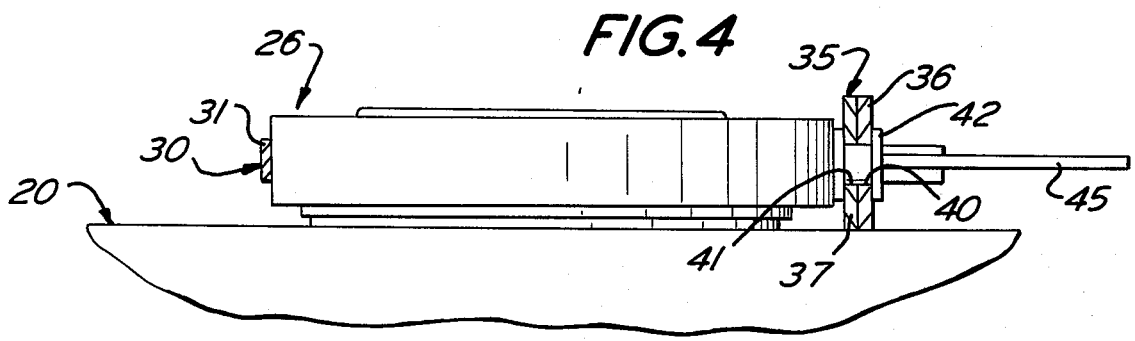

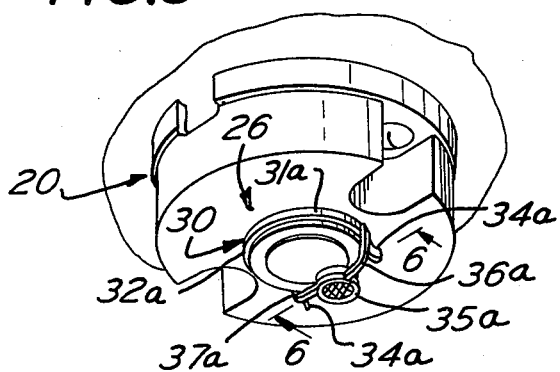
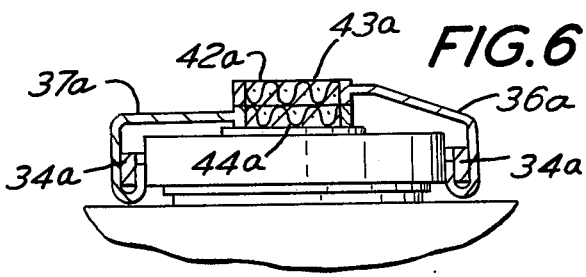
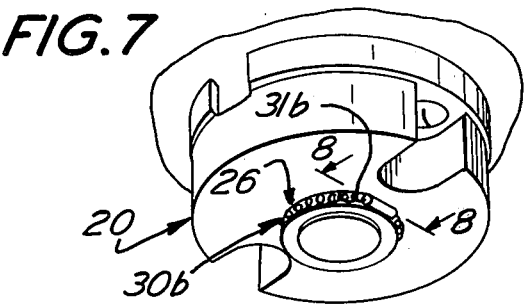
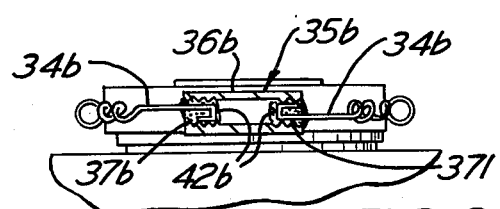
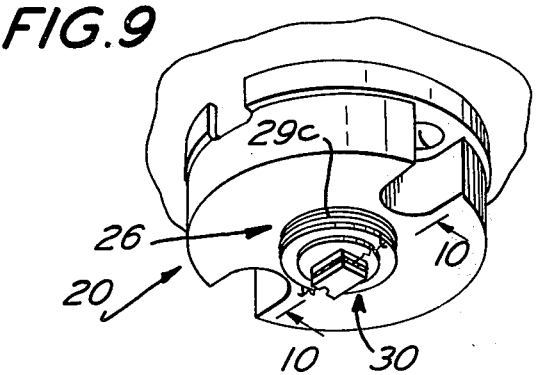
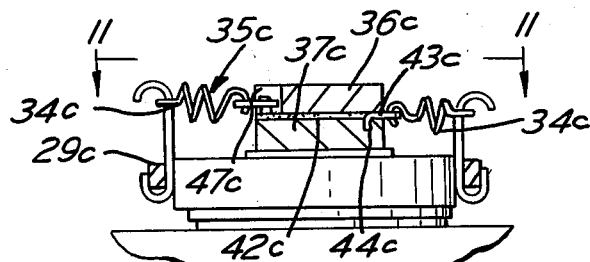
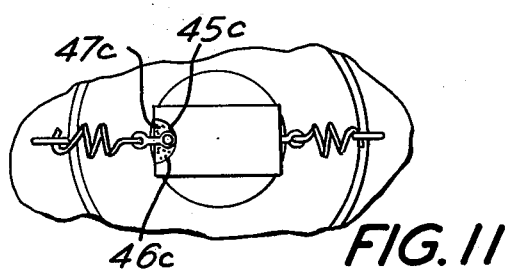
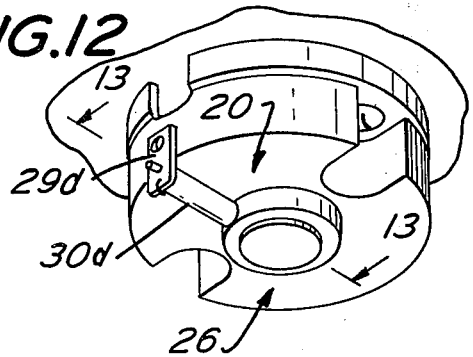
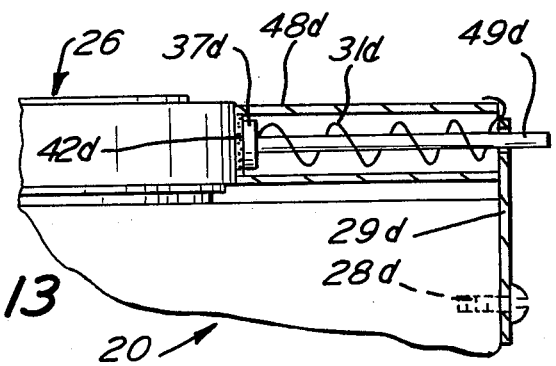

ACTIVATION INDICATOR FOR A FIRE DETECTOR

BACKGROUND OF THE INVENTION

As is well known to those versed in the field of fire alarms, in most buildings of commercial or multiple unit character there are a plurality of fire or elevated temperature detectors or sensors, which are usually all connected to an alarm and/or annunciator means announcing the floor location of the activated detector. In the event of fire this is usually a satisfactory mode of indicating the fire location. However, there is currently a problem of false alarms insidiously caused by holding a lighted match proximate to a fire detector to activate the internal bimetal element and operate the central alarm. Upon removal of the match, the bimetal returns to its normal position and offers no indication of having been activated. Thus, the temporarily activated bimetal element close a switch to operate the annunciator, and upon answering the alarm there is found no fire, and no indication of which detector has been activated, giving rise to the conclusion that a short circuit exists and energized the alarm. In most buildings, the annunciator only indicates the floor, so that a false alarm would require testing of all the detectors on the indicated floor as well as the circuitry and wiring associated with the indicated floor.

SUMMARY OF THE INVENTION

It is, therefore, an important object of the present invention to provide a unique device for indicating the activation of a particular detector, as by a false alarm, and thereby avoid the necessity of testing all possible detectors and associated wiring.

It is another object of the present invention to provide an activation indicator for a fire detector which is extremely simple in construction, economical to manufacture and install, affords quick, easy and positive indication of activation, and is entirely reliable throughout a long useful life.

It is still a further object of the present invention to provide an activation indicator of a type described, having the advantageous characteristics mentioned in the preceding paragraphs, which is adapted to assume a variety of embodiments each of which includes an attachment member for positioning proximate to a detector and affixation in its proximate position by fusible securing means, together with resilient means urging the attachment member out of its proximate position for removing the attachment member upon temperature elevation and melting of the securement means.

Other objects of the present invention will become apparent upon reading the following specification and referring to the accompanying drawings, which for a material part of this disclosure.

The invention accordingly consists in the features of construction, combinations of elements, and arrangements of parts, which will be exemplified in the construction hereinafter described, and of which the scope will be indicated by the appended claims.

BRIEF DESCRIPTION OF THE DRAWINGS

FIG. 1 is a perspective view, from below, showing a fire detector having associated therewith an activation indicator constructed in accordance with the teachings of the present invention.

FIG. 2 is a bottom plan view of the detector and indicator of FIG. 1.

FIG. 3 is a perspective view showing the indicator of FIGS. 1 and 2 apart from the detector.

FIG. 4 is a sectional view taken generally along the line 4—4 of FIG. 2.

FIG. 5 is a perspective view similar to FIG. 1 showing a slightly modified embodiment of indicator of the present invention in association with a detector.

FIG. 6 is a partial sectional view taken generally along the line 6—6 of FIG. 5.

FIG. 7 is a perspective view showing another embodiment of indicator in association with a detector.

FIG. 8 is a partial sectional view taken generally along the line 8—8 of FIG. 7.

FIG. 9 is a perspective view showing still another embodiment of indicator in association with a fire detector.

FIG. 10 is a partial sectional view taken generally along the line 10—10 of FIG. 9.

FIG. 11 is a view taken generally along the line 11—11 of FIG. 10.

FIG. 12 is a perspective view showing another embodiment of indicator in association with a fire detector.

FIG. 13 is a partial sectional elevational view taken generally along the line 13—13 of FIG. 12.

DESCRIPTION OF THE PREFERRED EMBODIMENTS

Referring now more particularly to the drawings, and specifically to FIGS. 1–4 thereof, a fire alarm fixture is there generally designated 20, and illustrated as fixed to the downwardly facing surface 21 of a ceiling as by fasteners 22. The fixture 20 may be generally conventional, including a base 24 secured in facing engagement with the ceiling surface 21, and carrying on its underside a housing 25. The housing 25 is centrally provided on its underside with a temperature sensor or detector 26 which may be of generally cylindrical configuration projecting axially downwardly from the housing 24.

The structure thus far described may be conventional, and may commonly include in the detector 26 a bimetallic or otherwise heat-sensitive switch (not shown) responsive to a predetermined elevated temperature for closing a circuit to energize an alarm or annunciator.

As is well known, in many buildings, say in walk-up apartment buildings, a plurality of alarm devices 20 are mounted at different locations on each floor, and all electrically connected to a single annunciator for indicating the floor location of an activated alarm device. However, for economy, most annunciator devices do not indicate the particular sensor or detector station 20 which has been activated on the indicated floor.

In accordance with the instant invention there is associated with each alarm device or station 20 an activation indicator, generally designated 30.

The indicator 30 is best seen in FIGS. 2, 3 and 4 and may include resilient means 31, say in the form of an elongate spring strip or leaf of a generally U-shaped configuration including an arcuate medial or bight portion 32 and a pair of legs 33 extending from opposite ends of the bight portion and spaced from each other. The legs 33 terminate in respective end portions 34 spaced from each other and generally divergent in the direction toward their free ends.

The resilient element 31 extends in embracing relation about the cylindrical detector 26 and is retained in embracing engagement by connection means, generally designated 35, extending between the spaced end portions 34 of the resilient element 31.

More specifically, the connection means 35 may include a pair of attachment members, links or plates 36 and 37 disposed in face-to-face or overlying relationship with respect to each other and having respective through holes 38 and 39, best seen in FIG. 3.

The overlapping or face-to-face inner end portions of attachment members or plates 37 and 36 are respectively provided with registering through holes or perforations, as at 40 and 41, see FIG. 4. Extending through the aligned perforations or holes 40 and 41 and securing together the attachment members 36 and 37, is a rivet, fastener or other securement means 42 fabricated of fusible material, such as solder, having a selected melting point, say corresponding to the activation temperature of the associated detector station 20.

The divergent end portions 34 of resilient element 31 extend slidably through respective holes or openings 38 and 39 and serve, as by camming action, to urge the attachment members and their securement means 42 radially inwardly toward an optimum heat exchange relation with respect to the detector proper 26. Advantageously, the connection means 35 is cammed radially inwardly to engage the fusible securing means 42 with the sensor or detector, tangentially thereof.

By this construction the resilient element 31 is maintained in embracing engagement about the detector 26, being frictionally held thereon, and simultaneously the connector means 35 of attachment members 36 and 37 and fusible securement means 42 is urged into heat exchange relation with the detector. A signal element or flag 45 may be carried by one of the attachment members 36, and extend therefrom for enhancing visual attention to the intact existance of the indicator 30.

Upon activation of the sensor or detector 26, say by a lit match, to effect a false alarm, the fusible securement means 42 will melt and, under the resilient separating force of distended spring strip 32, the attachment members 36 and 37 will separate, permitting opening of the bight portion 31 and release of the indicator assembly 30 from the detector for gravitational falling to the ground. Upon inspection, the absence of the indicator 30, particularly by the absence of signal flag 45, will be readily apparent to indicate activation of the detector 26.

Replacement of the indicator 30 with a renewed securement means 42, or assembly of an entirely new indicator 30 with the detector station 20 may be quickly and easily effected by merely distending the spring strip 31 of the assembled indicator 30 for engagement over the sensor proper 26 and release of the assembly to assume its frictional embracing engagement about the sensor. Alternatively, the spring strip 31, apart from the connection means 35, may be engaged about the sensor 26 and the strip end portions 34 deflected for engagement through the attachment member 38 and 39, for the indicator 30 to again assume its assembled frictional embracing engagement with the sensor proper 26.

In the modified embodiment of FIGS. 5 and 6, the station 20 includes a detector proper 26 and the indicator 30a is in frictional embracing engagement about the sensor 26.

In particular, the indicator 30a may include a generally U-shaped resilient element or spring strip 31a including an arcuate bight portion 32a and spaced apart divergent end portions 34a.

Extending between and resisting the resilient deflection force of the strip end portions 34a is connection means, generally designated 35a. The connection means 35a includes a pair of attachment members 36a and 37a having enlarged overlapping inner portions, as at 43a and 44a, which may be of perforate or reticulate construction, having opposite end portions 38a and 39a configured to receive and engage with opposite end portions 34a of resilient element 31a. The attachment member distal end portions 38a and 39a may be hooks, as best seen in FIG. 6, or other suitable construction for retaining engagement with spaced end portions 34a of resilient element 31a. Also, by suitable fusible securing means 42a, such as solder, or the like, the overlapping inner attachment member end portions 43a and 44a are suitably fixed together and releasable upon elevated temperature as determined by the melting point of the securing means.

It will now be appreciated that the attachment members 36a and 37a are retained in optimum heat exchange relation with respect to the detector proper 26, as by extending chordally across the detector in facing engagement with the end surface of the latter. As in the first described embodiment, the resilient element or strip spring 31a frictionally embraces the detector proper 26 to retain the indicator 30a on the detector, and upon separation of the attachment members 36a 37a under the influence of elevated temperature, the resilient element opens to release the assembly for gravitational falling from the detector station 20. Of course, replacement may be effected as in the first described embodiment.

In the embodiment of FIGS. 7 and 8, there is shown a detector station 20 including a sensor 26 provided with an activation indicator 30b. The indicator 30b includes a resilient element 31b in embracing engagement about the sensor 26, and may be an extensile and retractile coil spring having end portions 34b spaced from each other. Connection means 35b is interposed between and connects the spring end portions 34b. The connection means may include an open-ended tubular attachment member 36b which may have its opposite internal end portions threaded or otherwise suitably serrated, as at 37b and respectively receiving the resilient element end portions 34b. Fusible securement means, such as solder material or plugs 42b may occupy the end portions of attachment member 36b, positively interengaging with the internal threads 37b and the spring end portions 34b.

It will now be appreciated that the resilient element or coil spring 31b frictionally embraces the detector element 26, yieldably holding the attachment member 36b in bearing engagement and heat exchange relation with the detector. Hence, upon temperature elevation sufficient to activate the detector 26, the properly selected fusible securing means 42b will melt and release the attachment member 36b from at least one spring end 34b. Whereupon the indicator 30b will release from the detector 26 and fall gravitationally to indicate, by its absence, activation of the detector. Of course, replacement of the indicator 30b may be readily effected, after replacement of melted securing solder 42b, by mere distention to engage about the detector elements 26.

The additional embodiment shown in FIGS. 9–11 includes a fire detector station 20 having a detector element 26 and provided with an activation indicator generally designated 30c. The activation indicator includes a band, split ring, or the like, as at 29c frictionally engaged about the sensor element 26 for securement thereto. A pair of facing, overlying attachment members or plates 36c and 37c are releasably secured to each other, as by an interposed layer of fusible securing means or solder 42c, and the soldered attachment members are located in facing engagement with the underside or lower end surface of cylindrical sensor element 26, for optimum heat exchange relation therewith.

Connection means 35c extends between the attachment members 36c and 37c and the anchor means or band 29c. More specifically, the connection means includes a pair of resilient extension members or coil springs 34c extending from diametrically opposed regions of anchor band 29c radially inwardly toward the attachment members 36c and 37c. The inner end of one spring 34c, the right-hand spring as seen in FIGS. 10 and 11, may be provided with an end portion 43c engageable between the attachment members and having a transverse projection for removable entry into and positive interengagement with the attachment member 37c, see FIG. 10. The resilient means 34c on the left side includes an end extension 45c located in an adjacent end opening 46c of the attachment member or plate 36c, and embedded in the end opening in fusible securing means or solder 47c.

Here again, it will be appreciated that upon temperature elevation of the sensor 26, the attachment members 36c and 37c are in heat exchange relation with the sensor to promptly melt the securing means or solder 42c and/or 47c for release of the attachment members away from their proximate position with respect to the sensor, to indicate activation of the latter.

Of course, upon resoldering of the securing means 42c and 47c, the indicator 30c may be replaced in position, as by interconnection of the connection means 35c.

A final embodiment is shown in FIGS. 12 and 13, wherein a fire detector station 20 includes a detector element or sensor 26 and is provided with an activation indicator generally designated 30d.

As best seen in FIG. 13, the activation indicator 30d may include an attachment member or plate 37d in adjacent relation with respect to the sensor 26, advantageously fixed relative to the latter by fusible securing means or solder 42d interposed between the attachment member and sensor. An anchor bracket, such as arm 29d, may be suitably fixed to the station 20, as by a fastener 28d, and may extend to a location generally radially outwardly of the attachment member 37d. Resilient means 31d, such as an extension spring may have one end secured to attachment member 37d and have its outer end connected to anchor bracket 29d for resiliently yieldably urging the attachment member radially outwardly away from the sensor 26. A housing 48d, say generally cylindrical, may extend from the anchor bracket 29d enclosing and receiving the resilient element 31d and attachment member 37d, and a rod or pin 49d may extend from the attachment member slidably through and out of the anchor bracket to providde an indication of the position of the attachment member.

That is, upon temperature elevation of the sensor 26, the fusible securing means 42 is caused to melt and release the attachment member 37d for radially outward withdrawal under the influence of resilient means 31d. This shifts the free end of rod 49d outward to indicate activation of the sensor.

From the foregoing, it is seen that the present invention provides an activation indicator for a fire detector station which is extremely simple in construction, operation, installation and maintenance, and which otherwise fully accomplishes its intended objects.

Although the present invention has been described in some detail by way of illustration and example for purposes of clarity of understanding, it is understood that certain changes and modifications may be made within the spirit of the invention.

What is claimed is:

1. An activation indicator for an overhead fire detector, said indicator comprising attachment members in end-to-end overlapping relation for positioning adjacent to one side of the detector, fusible securement means fixing said attachment members together, and an elongate resilient element deflected to embrace the other side of the detector with its end portions connected to distal regions of said attachment members urging the latter out of said relation, whereby elevated temperature melts said securement means to release said attachment members for separation thereof and gravitational falling to indicate said temperature elevation.

2. An activation indicator according to claim 1, said resilient element comprising a spring strip having its end portions outstanding from the detector and diverging from each other, said attachment members and fusible securement means being connected between said diverging end portions and urged thereby toward the detector for optimum heat exchange relation with the latter.

3. An activation indicator according to claim 1, said attachment members being apertured, and said end portions extending through said apertures.

4. An activation indicator according to claim 3, said attachment members being in face-to-face relation, and said securement means being interposed between the adjacent faces of said attachment members.

5. An activation indicator according to claim 4, one of said attachment members having an end opening facing toward one of said resilient element end portions, said securement means being located in said end opening for connection to said resilient element end portion.

6. An activation indicator according to claim 1, one of said attachment members being tubular, said fusible securement means being located in said tubular attachment member and the other of said attachment members extending from said resilient element into said tubular member.

7. An activation indicator according to claim 6, said tubular attachment member being internally serrated for positive interengagement with said securing means.

* * * * *